United States Patent
Lien et al.

(10) Patent No.: US 7,996,662 B2
(45) Date of Patent: Aug. 9, 2011

(54) FLOATING POINT STATUS/CONTROL REGISTER ENCODINGS FOR SPECULATIVE REGISTER FIELD

(75) Inventors: Wei-Han Lien, San Jose, CA (US); Daniel C. Murray, Morgan Hill, CA (US); Junji Sugisawa, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1234 days.

(21) Appl. No.: 11/281,832

(22) Filed: Nov. 17, 2005

(65) Prior Publication Data

US 2007/0113060 A1    May 17, 2007

(51) Int. Cl.
| G06F 7/38 | (2006.01) |
| G06F 9/00 | (2006.01) |
| G06F 9/44 | (2006.01) |
| G06F 15/00 | (2006.01) |

(52) U.S. Cl. ....................................................... 712/244
(58) Field of Classification Search .................... 712/244
See application file for complete search history.

(56) References Cited

U.S. PATENT DOCUMENTS

| 5,673,426 | A | * | 9/1997 | Shen et al. .................... 712/244 |
| 5,692,169 | A | * | 11/1997 | Kathail et al. ................. 712/244 |
| 5,778,219 | A | * | 7/1998 | Amerson et al. .............. 712/244 |
| 5,867,683 | A | * | 2/1999 | Witt et al. ...................... 712/218 |
| 5,987,600 | A | * | 11/1999 | Papworth et al. ............. 712/244 |
| 6,021,488 | A | * | 2/2000 | Eisen et al. .................... 712/228 |
| 6,049,868 | A | * | 4/2000 | Panwar .......................... 712/244 |
| 6,112,019 | A | * | 8/2000 | Chamdani et al. ............. 712/214 |
| 6,125,443 | A | * | 9/2000 | Takahashi ...................... 712/244 |
| 6,216,222 | B1 | * | 4/2001 | Hinds et al. .................... 712/244 |
| 6,223,278 | B1 | * | 4/2001 | Morrison ....................... 712/227 |
| 6,266,763 | B1 | | 7/2001 | Witt et al. |
| 6,484,251 | B1 | * | 11/2002 | McDonald et al. ............. 712/23 |

OTHER PUBLICATIONS

John Paul Shen & Mikko H. Lipasti; Modern Processor Design: Fundamentals of Superscalar Processors; 2003; McGraw Hilll Beta Edition; pp. 159-161.*
"PowerPC User Instruction Set Architecture," Book I, Version 2.01, Sep. 2003, IBM, pp. 81-116.

* cited by examiner

*Primary Examiner* — Eddie Chan
*Assistant Examiner* — Corey Faherty
(74) *Attorney, Agent, or Firm* — Lawrence J. Merkel; Meyertons, Hood, Kivlin, Kowert & Goetzel, P.C.

(57) ABSTRACT

In one embodiment, a processor comprises a plurality of storage locations, a decode circuit, and a status/control register (SCR). Each storage location is addressable as a speculative register and is configured to store result data generated during execution of an instruction operation and a value representing an update for the SCR. The value includes at least a first encoding that represents an update to a plurality of bits in the SCR, and a first number of bits in the plurality of bits is greater than a second number of bits in the first encoding. The decode circuit is coupled to receive the first encoding from a first storage location responsive to retirement of a first instruction operation assigned to use the first storage location as a destination, and is configured to decode the first encoding and generate the plurality of bits. The decode circuit is configured to update the SCR.

20 Claims, 6 Drawing Sheets

| Bit | Name |
|---|---|
| 0 | FP Exception Summary (FX) |
| 1 | FP Enabled Exception Summary (FEX) |
| 2 | FP Invalid Operation Exception Summary (VX) |
| 3 | FP Overflow Exception (OX) |
| 4 | FP Underflow Exception (UX) |
| 5 | FP Zero Divide Exception (ZX) |
| 6 | FP Inexact Exception (XX) |
| 7 | FP Invalid Operation Exception(SNaN) (VXSNAN) |
| 8 | FP Invalid Operation Exception(Inf-Inf) (VXISI) |
| 9 | FP Invalid Operation Exception(Inf/Inf) (VXIDI) |
| 10 | FP Invalid Operation Exception(0/0) (VXZDZ) |
| 11 | FP Invalid Operation Exception(Inf x 0) (VXIMZ) |
| 12 | FP Invalid Operation Exception(Compare) (VXVC) |
| 13 | FP Fraction Rounded (FR) |
| 14 | FP Fraction Inexact (FI) |
| 15 | FP Result Class Descriptor (C) |
| 16 | FP Less Than or Negative (FL) |
| 17 | FP Greater Than or Positive (FG) |
| 18 | FP Equal or Zero (FE) |
| 19 | FP Unordered or NaN (FU) |
| 20 | (Reserved) |
| 21 | FP Invalid Operation Exception(Software) (VXSOFT) |
| 22 | FP Invalid Operation Exception(Square Root) (VXSQRT) |
| 23 | FP Invalid Operation Exception(Int Convert) (VXCVI) |
| 24:31 | FP Control Bits |

Bits 16–19 are bracketed as FPCC.

Fig. 3

| 0:4 | 5 | 6 | 7:10 |
|---|---|---|---|
| Exception Encoding | FR | FI | C/FPCC Encoding |

| Exception Encoding | Definition |
|---|---|
| 00000 | Set OX |
| 00001 | Set UX |
| 00010 | Set ZX |
| 00011 | Set XX |
| 00100 | Set OX and XX |
| 00101 | Set UX and XX |
| 00110 | Set VXSNAN |
| 00111 | Set VXISI |
| 01000 | Set VXIDI |
| 01001 | Set VXZDZ |
| 01010 | Set VXIMZ |
| 01011 | Set VXVC |
| 01100 | Set VXSQRT |
| 01101 | Set VXCVI |
| 01110 | Set VXSNAN and VXIMZ |
| 01111 | Set VXSNAN and VXVC |
| 10000 | Set VXSNAN and VXCVI |
| 11111 | None |

Fig. 5

| C/FPCC Encoding | Definition |
|---|---|
| 0000 | No change |
| 0001 | C unchanged, FPCC=0001, FR/FI unchanged |
| 0010 | C=0, FPCC=0010 |
| 0011 | undefined (fcti) |
| 0100 | C=0, FPCC=0100 |
| 0101 | C=0, FPCC=0001 |
| 0110 | C=0, FPCC=1000 |
| 0111 | C=0, FPCC=1001 |
| 1000 | FRT, C, & FPCC unchanged, clear FR/FI |
| 1001 | C=1, FPCC=1001 |
| 1010 | C=1, FPCC=0010 |
| 1011 | C unchanged, FPCC=0010, FR/FI unchanged |
| 1100 | C=1, FPCC=0100 |
| 1101 | C unchanged, FPCC=0100, FR/FI unchanged |
| 1110 | C=1, FPCC=1000 |
| 1111 | C unchanged, FPCC=1000, FR/FI unchanged |

Fig. 6

FLOATING POINT STATUS/CONTROL REGISTER ENCODINGS FOR SPECULATIVE REGISTER FIELD

BACKGROUND

1. Field of the Invention

This invention is related to the field of processors and, more particularly, to capturing status/control register updates in processors.

2. Description of the Related Art

Processors are designed to execute instructions defined in an instruction set architecture. There are a variety of instruction set architectures in use (e.g. the PowerPC™ architecture defined by IBM, the MIPS™ architecture defined by MIPS, the ARM™ architecture defined by ARM, the SPARC™ architecture defined by Sun Microsystems, the IA-32 (or x86) architecture defined by Intel, etc.). Typically, the instruction set architecture assumes a sequential execution model for defining the instructions (in which each instruction completes execution in-order, non-speculatively).

To increase performance, many processors implement speculative execution in which a given instruction may be executed speculatively (that is, prior to ensuring that the instruction is actually to be executed according to the sequential execution model). For example, instructions may be executed out of order with respect to the program order of the instructions. Instructions may be executed that are dependent on a prediction, such as a branch prediction. If a preceding instruction experiences an exception or misprediction, the speculatively executed instructions are not, in fact, executed and the results of their speculative execution must be discarded.

One method for supporting speculative execution includes the use of speculative registers to store the speculatively-generated results of instruction execution. If the speculative execution is correct, the speculatively-generated results are moved from the speculative registers to architected registers defined in the instruction set architecture. If the speculative execution is not correct, the speculatively-generated results are not moved and thus the speculative results are effectively discarded.

In some cases, instructions may generate updates for other registers besides the destination register that stores the result. For example, status/control registers may be defined that store exception bits indicating exceptions that occur during instruction execution. The speculative registers may be defined to store the contents of the status/control register (as updated in response to the instruction) in addition to the result data, or a different speculative register may be assigned to store the contents. Unfortunately, the amount of space needed to store both the result data and the data to update the status/control register may be large, and may increase the size of the storage needed to implement the speculative registers.

SUMMARY

In one embodiment, a processor comprises a plurality of storage locations, a decode circuit coupled to the storage locations, and a status/control register (SCR) coupled to the decode circuit. Each of the storage locations is addressable as a speculative register and is configured to store result data generated during execution of an instruction operation and a value representing an update for the SCR. The value includes at least a first encoding that represents an update to a plurality of bits in the SCR, and a first number of bits in the plurality of bits is greater than a second number of bits in the first encoding. The decode circuit is coupled to receive the first encoding from a first storage location responsive to retirement of a first instruction operation assigned to use the first storage location as a destination, and is configured to decode the first encoding and generate the plurality of bits. The decode circuit is configured to update the SCR.

In another embodiment, a processor comprises a plurality of storage locations, a register, and a decode circuit. Each storage location is addressable as a speculative register and is configured to store result data generated during execution of an instruction operation and an exception encoding indicative of one or more exceptions detected during execution of the instruction operation, if any. The register is defined to store an architected state that includes a plurality of exception bits, wherein each of the plurality of exception bits corresponds to a different exception that is detectable during execution of a given instruction operation. A first number of the plurality of exception bits is greater than a second number of bits in the exception encoding. Coupled to the plurality of storage locations and the register, and coupled to receive a first exception encoding from a first storage location of the plurality of storage locations responsive to retirement of a first instruction operation assigned to use the first storage location as a destination, the decode circuit is configured to decode the first exception encoding and update the register.

In yet another embodiment, a processor comprises a register file comprising a plurality of speculative register storage locations and a plurality of architected register storage locations and an execution circuit coupled to the register file. Each of the speculative register storage locations is configured to store result data and a value corresponding to a status/control register (SCR). The value comprises at least one encoded field corresponding to a plurality of bits in the SCR, wherein a first number of the plurality of bits is greater than a second number of bits in the encoded field. The register file further comprises a register configured to store an architected state of the SCR. The execution unit is configured to execute an instruction operation to generate result data, and comprises an encode circuit configured to encode the value. The execution unit is configured to transmit the result data and the value to the register file for storage in one of the plurality of speculative register storage locations.

BRIEF DESCRIPTION OF THE DRAWINGS

The following detailed description makes reference to the accompanying drawings, which are now briefly described.

FIG. 3 is a table illustrating bit definitions in a floating point status and control register (FPSCR).

FIG. 4 is a block diagram of one embodiment of a FPSCR field in the speculative registers shown in FIG. 2.

FIG. 5 is a table illustrating one embodiment of an exception encoding for the exception encoding field shown in FIG. 4.

FIG. 6 is a table illustrating one embodiment of a condition code encoding for the condition code encoding field shown in FIG. 4.

Figure 1:
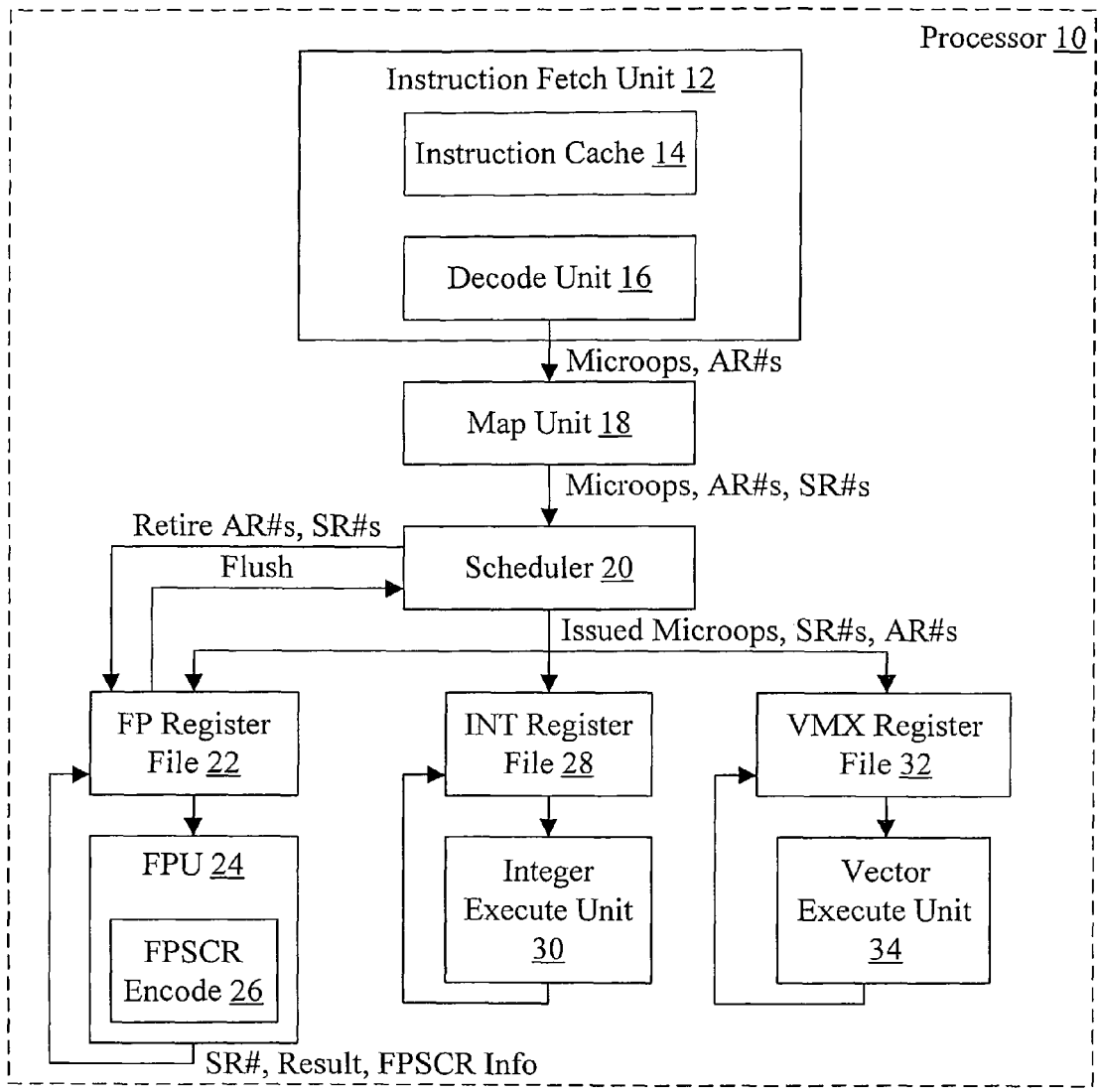
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes an instruction fetch unit 12 (which includes an instruction cache 14 and a decode unit 16), a map unit 18, a scheduler 20, a floating point (FP) register file 22, a floating point unit (FPU) 24 (which includes a floating point status and control register (FPSCR) encode circuit 26), an integer (INT) register file 28, an integer execute unit 30, a vector (VMX) register file 32, and a vector execute unit 34. The instruction fetch unit 12 (and more particularly the decode unit 16) is coupled to the map unit 18, which is further coupled to the scheduler 20. The scheduler 20 is coupled to the register files 22, 28, and 32, which are further coupled to the respective execution units 24, 30, and 34 as illustrated in FIG. 1. The processor 10 may include other units, as desired (e.g. a load/store unit for load/store operations, a data cache, etc.), not shown. Furthermore, other embodiments may have other constructions include subsets of the units shown in FIG. 1, additional units, etc.

The instruction fetch unit 12 is configured to fetch instructions for execution in the processor 10. The instructions fetched may be instructions defined in the instruction set architecture implemented by the processor 10. For example, in one embodiment, the processor 10 may implement the PowerPC instruction set architecture. The PowerPC instruction set architecture will be used as an example herein, but other embodiments may implement any other instruction set architecture (e.g. MIPS, ARM, x86, SPARC, etc.). The instruction fetch unit 12 includes the instruction cache 14, in this embodiment, to store instructions for fetching. Fetched instructions are provided to the decode unit 16 for decoding.

In the present embodiment, the decode unit 16 is configured to decode each instruction into one or more instruction operations (referred to as "microops" herein). Generally, an instruction operation comprises an operation that the execution units included in the processor 10 are designed to execute. Simple instructions may decode to one microop. More complex operations may decode to multiple microops. In some embodiments, instructions which decode to more than a few microops (e.g. two) may be decoded into a microcode entry point in a microcode unit in the decode unit 16 (not shown), from which microops may be read for execution. In other embodiments, each instruction may correspond to one instruction operation (e.g. the terms instruction operation and instruction may be synonymous in such embodiments).

The decode unit 16 may transmit microops to the map unit 18. Each microop may include the architected register numbers (AR#s) of the source operand(s) and destination of the microop. The architected register numbers identify the architected registers that store operands or are identified as the destination of the instruction. Generally, an architected register may be a register that is defined in the instruction set architecture. The architected register may be coded into an instruction defined in the instruction set architecture as an operand (source or destination).

The map unit 18 may map the architected register numbers to speculative registers numbers (SR#s). The processor 10 may implement speculative execution, and may employ speculative registers to store speculative results. The speculative register numbers identify the speculative registers that correspond to the architected registers for a given microop. Generally, the map unit 18 may maintain a mapping from each architected register to the speculative register that was most recently assigned to store a result of an instruction that has that architected register as its destination. The map unit 18 may read the map to determine the speculative registers that correspond to each source architected register for a given microop, and may assign a currently-unused speculative register to the destination of the microop. That is, the microop may use the assigned speculative register as its destination for execution. When the microop is retired, the result may be moved from the speculative register to the architected register. The map unit 18 may update the map to record the mapping of the assigned speculative register to the destination architected register.

The map unit 18 provides the microops, the AR#s, and the SR#s to the scheduler 20, which stores the microops until they may be issued for execution. The scheduler 20 may be responsible for tracking dependencies of microops and scheduling microops for execution when dependencies have been satisfied. Additionally, the scheduler 20 may coordinate the retirement of microops as they become non-speculative. In one embodiment, the map unit 18 may assign the scheduler entry for each microop in addition to mapping the AR#s to SR#s. In one particular embodiment, the number of speculative registers may be equal to the number of scheduler entries, and the SR# for a microop's destination may be the same as its scheduler entry number. In other embodiments, a separate scheduler entry number may be used and the number of speculative registers may differ from the number of scheduler entries.

The scheduler 20 transmits an issued microop (with SR#s and AR#s) to one of the register files 22, 28, and 32 to read source operands, dependent on the type of issued microop. That is, floating point microops are transmitted to the floating point register file 22; integer microops are transmitted to the integer register file 28; and vector microops are transmitted to the VMX register file 32. A microop's type depends on the type of instruction from which it was decoded (e.g. integer, floating point, or vector). For example, the PowerPC instruction set architecture defines integer (or fixed point), floating point, and AltiVec (vector) instructions. Integer instructions operate on integer operands (operands having a magnitude only). Floating point instructions operate on floating point operands, in which the operand value comprises sign, exponent, and significand portions. Vector instructions operate on single instruction, multiple data (SIMD) operands in which a given operand comprises multiple independent data values.

The source operands read from the register file 22, 28, or 32 (or forwarded to the issue microop, if operand forwarding is implemented) and microops are provided to the execution units 24, 30, and 34 for execution, respectively, as illustrated in FIG. 1. The result data is output by the execution units 24, 30, and 34 to the respective register file 22, 28, or 32 for storage (along with the corresponding SR# to identify the speculative register that is to store the result data).

Both SR#s and AR#s may be transmitted for issued microops to provide for the possibility that a given source operand of an issued microop may have been written from its speculative register to the corresponding architected register prior to the microop being issued. A value may be read from a given speculative register and written to a given architected register in response to retirement of the microop that was assigned the given speculative register for its destination by the map unit 18 and which has the given architected register as its actual destination.

Accordingly, the register files 22, 28, and 32 may each comprise storage locations addressable as speculative registers and other storage locations addressable as architected registers. A storage location is addressable as a speculative register if that storage location is read/written in response to a corresponding speculative register number. Similarly, a storage location is addressable as an architected register if that storage location is read/written in response to a corresponding architected register number. The storage locations may be provided in any fashion (e.g. as memory arrays such as random access memory (RAM) arrays, individual registers or other clocked storage devices, combinations of the above, etc.). For brevity, the present description may refer to reading/writing a speculative or architected register. Such description may refer to reading/writing the storage location that is addressable as that register.

The interface between the scheduler 20, the floating point register file 22, and the FPU 24 is shown in greater detail in FIG. 1 for one embodiment. Particularly, in addition to transmitting issued floating point microops (with SR#s and AR#s) to the floating point register file 22, the scheduler 20 may also provide the floating point register file 22 with the AR#s and SR#s of one or more floating point microops that are being retired (if any). In some cases, the floating point register file 22 may indicate that a flush of microops subsequent to a retired microop is needed (as discussed in more detail below), and may communicate the flush to the scheduler 20. Furthermore, the floating point unit 24 may transmit the SR# of the destination of an executed floating point microop along with result data and an encoded FPSCR value (FPSCR info) corresponding to the floating point microop. The FPSCR info may be generated by the FPSCR encode circuit 26.

The floating point instructions (and thus the floating point microops executed by the floating point unit 24) are defined to generate a result and many of the computational floating point instructions are also defined to update the status portion of the FPSCR register. In the present embodiment, the speculative registers in the floating point register file 22 are configured to store the result data as well as the FPSCR info provided by the floating point unit 24. A separate rename space and set of speculative registers for the FPSCR may thus be avoided in the present embodiment.

The status portion of the FPSCR may include a variety of information. In one embodiment, the status portion includes a set of exception bits that may be used to record various exceptions detected during execution. The exceptions, if enabled in the control portion of the FPSCR, may cause the processor 10 to interrupt instruction execution and fetch from an exception vector (e.g. the floating point enabled exception vector) to permit software to handle the exception. While a floating point microop may, in general, generate any of the exceptions, some exceptions are mutually exclusive and cannot concurrently occur during a given execution of a floating point microop. Accordingly, some combinations of exceptions cannot occur. The possible combinations of exceptions may be assigned various values of an encoding (referred to as an exception encoding), and the FPSCR encode circuit 26 may generate the exception encoding for a given executed floating point microop. The exception encoding may be part of the FPSCR info transmitted by the floating point unit 24. The number of exception bits in the FPSCR may be greater than the number of bits in the exception encoding. By storing the exception encoding instead of the exception bits, fewer bits may be included in each speculative register for storing the FPSCR info, in some embodiments. For example, in one implementation, 5 bits of exception encoding may be provided to represent the possible combinations of 13 exception bits.

The status portion of the FPSCR may also include a class bit and condition code bits corresponding to the result. The class bit and condition code bits together may also be referred to as the floating point result flags (FPRF) of the FPSCR. The condition code bits, as part of the FPRF, are defined to represent negative, positive, zero, and not a number (NaN), respectively, for computational instructions. Various combinations of set condition code bits may be generated (along with the class bit) for results of computational instructions. The condition code bits are defined to represent less than, greater than, equal to, or unordered for comparison instructions, respectively, and the condition code bits may be mutually exclusive for comparison instructions. The floating point condition code bits and class bit may also be encoded in the FPSCR info. In the present embodiment, a four bit encoding in the FPSCR info may be used to represent the four bit condition code field and the class bit in the FPSCR.

When a given floating point microop is retired by the scheduler 20, the scheduler 20 may provide the AR# and SR# of the destination of the microop to the floating point register file 22. The floating point register file 22 may read the result data from the identified speculative register and write the result data to the identified architected register. Additionally, the floating point register file 22 may include a register to store the architected state of the FPSCR. The architected state may comprise the state of the FPSCR, as defined in the instruction set architecture. Updating the architected state may create the state that exists at the retirement of a given floating point instruction that corresponds to the retiring floating point microop. The floating point register file 22 may decode the encoded FPSCR info to generate the update for the register that stores the architected FPSCR state.

In some embodiments, multiple floating point microops may be concurrently retired. The scheduler may provide AR#s and SR#s for each concurrently retired microop, and the result data may be moved from the speculative registers to the architected registers. Additionally, the floating point register file 22 may merge the FPSCR updates to produce the architected state to be stored in the register that stores the architected FPSCR state.

The status portion may also include certain bits which are directly represented in the FPSCR info stored in the speculative registers. Such bits may be directly copied from the FPSCR to the register that stores the architected FPSCR state when the corresponding microop is retired. If multiple microops are concurrently retired, the updates from the youngest of the concurrently retired microops may be copied to the register that stores the architected FPSCR state.

Some floating point instructions may depend on the FPSCR. For example, the instruction set architecture may include explicit move from FPSCR instructions, which have the FPSCR as a source operand. Additionally, in the PowerPC instruction set architecture, some floating point instructions have a record option (indicated by setting a record bit defined in the instruction) which causes a portion of the FPSCR to be stored in another register. In one embodiment, the scheduler 20 does not record a dependency on the speculative FPSCR values for instructions that depend on the FPSCR. The microops may be scheduled, and use the architected state of the FPSCR. If a preceding instruction is subsequently retired and changes the state of the FPSCR, the instructions may be flushed. In one particular implementation, the floating point register file 22 may detect if the retirement of one or more microops causes an exception bit to be set that was previously clear. The exception bits may be architecturally defined to be "sticky". That is, once placed in the "sticky state" (set, in this embodiment, although other embodiments may define the sticky state as clear), they remain in the sticky state until explicitly changed using a move to FPSCR instruction. Accordingly, if the retirement of a microop causes an exception bit to be placed in the sticky state and it is not already in the sticky state, the floating point register file 22 may signal a flush for that microop to the scheduler 20. The scheduler 20 may flush microops subsequent to the identified microop, and the flushed microops may be subsequently rescheduled by the scheduler 20. Flushing the microops from the scheduler 20 may include simply changing state associated with the microops to cause them to be rescheduled, or may comprise deleting the microops and refetching the corresponding instruction, in various embodiments.

While the present embodiment includes an encoded FPSCR value comprising an exception encoding, a condition code encoding, and other bits that are directly represented, it is contemplated that other embodiments may encode only the exceptions, or only the condition codes, with the remaining bits directly represented. Additionally, in other embodiments, other instruction/microop types may have an encoded status/control register update stored in the speculative registers and decoded at retirement of the microops. For example, the integer register file 28 and/or the VMX register file 32 may include speculative registers that store result data and an encoded status/control register update. In such embodiments, the integer execute unit 30 and/or the vector execute unit 34 may include encode circuits similar to the encode circuit 26 in the floating point unit 24. Retirement of microops and updating of the architected registers and architected state of the status/control register may be performed similar to the above discussion for the FPSCR. Furthermore, if dependencies on the status/control register are not tracked and the architected state is used as discussed above, flushing may be supported.

While the embodiment of FIG. 1 (and FIG. 2 described below) includes speculative register storage locations in the registers files 22, 28, and 32, other embodiments may implement the speculative registers in other fashions. For example, embodiments of the processor 10 may implement a reorder buffer with a storage location for each speculative operation. The storage locations may be viewed as speculative register storage locations, and the SR# may be the reorder buffer tag assigned to the operation. The reorder buffer storage locations may include storage for the result and the FPSCR info (or other SCR info). As operations are retired, the result may be written to an architected register and the FPSCR info may be decoded and written to a register storing the architected FPSCR state.

Figure 2:
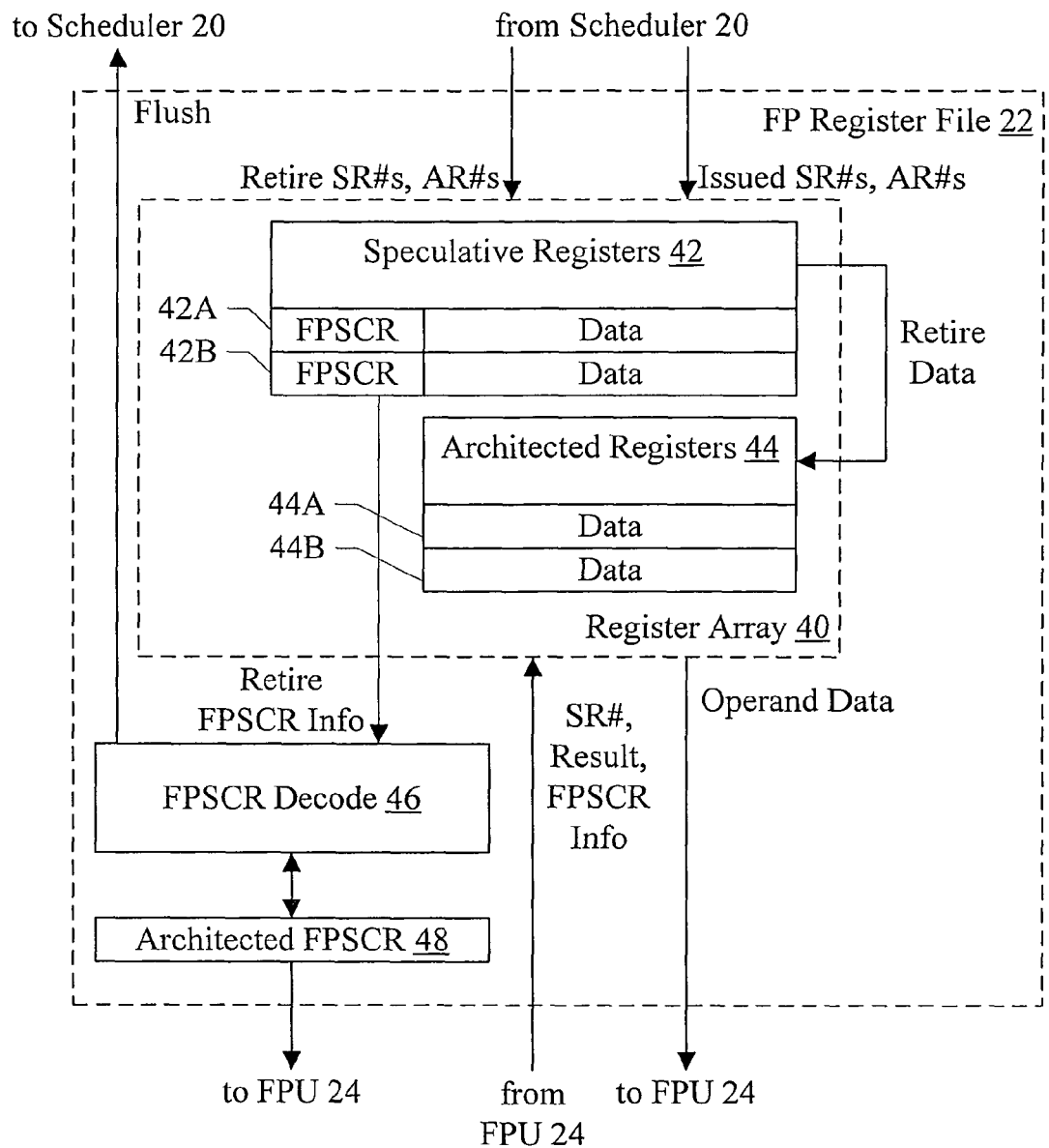
FIG. 2 is a block diagram of one embodiment of a register file.

Turning now to FIG. 2, a block diagram of one embodiment of the floating point register file 22 is shown. In the illustrated embodiment, the floating point register file 22 includes a register array 40 (comprising speculative register storage locations 42 and architected register storage location 44), an FPSCR decode circuit 46, and a register 48 storing the architected FPSCR state. The register array 40 is coupled to receive the issued SR#s and AR#s corresponding to an issued floating point microop and is coupled to provide operand data from the issued SR#s/AR#s to the FPU 24. The register array 40 is also coupled to receive the retire SR#s and AR#s corresponding to one or more retiring floating point microops from the scheduler 20 and to provide corresponding retire data from the retired speculative registers to the identified architected registers as well as to provide the FPSCR info from the retired speculative registers to the FPSCR decode circuit 46. The FPSCR decode circuit 46 is further coupled to provide the flush indication to the scheduler 20 and is coupled to the register 48. The contents of the register 48 are also provided to the floating point unit 24. The register array 40 is coupled to receive the SR# of an executed microop, the result data for the executed microop, and the FPSCR info for the executed microop from the floating point unit 24.

In the present embodiment, the register array 40 may comprise a memory array that includes speculative register storage locations 42 and architected register storage locations 44. In some embodiments, the storage locations 42 and 44 may comprise separate memory arrays, or a single array may be used which has larger memory locations for the speculative registers than for the architected registers. In other embodiments, clocked storage devices (e.g. registers, flops, latches, etc.) may be used to form the storage locations 42 and 44.

Exemplary storage locations 42A-42B in the speculative register storage locations 42 are shown in FIG. 2. As shown, each storage location includes a field for the result data of the microop ("Data" in FIG. 2) and a field for the FPSCR info, as encoded by the FPSCR encode circuit 26 ("FPSCR Info" in FIG. 2). By contrast, exemplary architected register storage locations 44A-44B include storage for the data only ("Data" in FIG. 2). The number of architected register storage locations 44 may equal the number of architected floating point registers specified in the instruction set architecture implemented by the processor 10 (e.g. 32 in the PowerPC architecture). Any number of speculative register storage locations 42 may be provided in various embodiments (e.g. 64).

In response to the issued SR#s and AR#s from the scheduler 20, the register array 40 may output operand data to the floating point unit 24. The SR#s address storage locations in the speculative register storage locations 42, and the AR#s address storage locations in the architected register storage locations 44. Generally, if the microop that updates the SR# of a given SR#/AR# pair has not yet been retired, the register array 40 outputs the value from the speculative register storage location 42 addressed by the SR#. If the microop has retired, the register array 40 outputs the value from the architected register storage location 44 addressed by the AR#. Any mechanism may be used to determine which SR#s correspond to retired microops. For example, in an embodiment in which the same number of speculative register storage locations are provided as scheduler entries and the scheduler entry number is the same as the SR# for a given microop, an extra bit may be included in the SR#/scheduler entry number over the number of bits used to address the entry/register. The extra bit may be flipped each time the scheduler entry number/SR# returns to zero as entries are assigned to consecutive microops. The SR# (except for the extra most significant bit) may be compared to the retire pointer of the scheduler 20 (which indicates the most recently retired microop, and may have the extra most significant bit as well). If the SR# is greater than the retire pointer and the most significant bits match, the microop is not retired. If the SR# is less than the retire pointer and the most significant bits mismatch, the microop is not retired. Otherwise, the microop is retired and the contents of the architected register storage location 44 addressed by the AR# is output. Other embodiments may use other mechanisms (e.g. a scoreboard of retired/not retired microops, etc.).

The floating point unit 24 returns the SR# of an executed microop, the result data, and the FPSCR info encoded by the encode circuit 26. The register array 40 writes the result data and FPSCR info into the speculative register storage location 42 addressed by the SR#.

In response to receiving a retire SR#/AR# pair from the scheduler 20, the register array 40 reads the result data from the speculative register storage location 42 addressed by the SR# and writes the result data to the architected register storage location 44 addressed by the AR#, thus moving the result data from the speculative register to the architected register. If multiple SR#/AR# pairs are provided for concurrent retire of multiple microops, the result data may be moved between the speculative registers and architected registers in the same fashion, in parallel, for each retired microop. In one embodiment in which the SR# is the same as the scheduler entry number, only one SR# may be provided (since consecutive microops are retired for in-order retirement of microops). Valid signals may be provided to identify which consecutive microops are floating point microops that are being retired.

Additionally, the FPSCR info from the FPSCR field of each addressed speculative register location 42 may be output to the FPSCR decode circuit 46. The FPSCR decode circuit 46 decodes the FPSCR info from the FPSCR field(s) to generate an update to the architected state of the FPSCR stored in the register 48. If multiple microops are concurrently being retired, the FPSCR decode circuit 46 may merge the updates. For example, for sticky bits such as the exception bits, the FPSCR decode circuit 46 may logically OR the updates and the current state of the exception bits in the architected state to provide the updated exception bits. For other bits, the youngest update to the bits may be selected.

The FPSCR decode circuit 46 may also compare the decoded exception bits to the current exception bits to determine if an exception bit that is currently clear is being set in the update. If so, the FPSCR decode circuit 46 may assert the flush signal to the scheduler 20. The FPSCR decode circuit 46 may also be configured to identify the retiring microop for which the flush is asserted, for embodiments in which multiple microops may be concurrently retired (e.g. by scheduler entry number, which may be the same as the SR# in some embodiments).

Turning next to FIG. 3, a table is shown illustrating a definition of one embodiment of the status bits in the architected state of the FPSCR register according to the PowerPC instruction set architecture. Bits 0:23 of the FPSCR register are status bits, and bits 24:31 are control bits in the illustrated embodiment. The bit number is shown in the left-hand column of the table, and the name of the bit is in the right hand column. A brief description of the status bits is provided below, but the bits are compatible with the PowerPC instruction set architecture, version 2.01. The architected state of the FPSCR, in the register 48, may match the description of the FPSCR as shown in FIG. 3 and may also including the architected control bits that are not shown in detail in FIG. 3.

Bits 3:12 and 21:23 are various individual exception bits. These exception bits are sticky as described above, and the possible combinations of these exceptions may be encoded in the exception encoding generated by the FPSCR encode circuit 26 and decoded by the FPSCR decode circuit 46. Bit 0, the floating point exception summary (FX) bit, is set if the instruction sets any of the exception bits that are currently clear. Bit 1, the floating point enabled exception summary (FEX) is set if the instruction sets any exception bit for which an exception is enabled in the control bits (not shown in FIG. 3). That is, the FEX may be the logical OR of the decoded exception bits for a retiring microop masked by the exception enables. Bit 2, the invalid operation exception summary (VX) is the logical OR of the invalid operation exception bits (bits 7-12 and 21-23). The FPSCR decode circuit 46 may generate bits 0:2 from the decoded FPSCR info and from the current state of the architected FPSCR in the register 48.

Bit 3 is the floating point overflow exception bit (OX), which is set if the magnitude of what would have been the rounded result if the exponent range were unbounded exceeds that of the largest finite number in the result precision. Bit 4 is the floating point underflow exception bit (UX). The UX is set if the underflow exception is enabled and the result is tiny, or if the underflow exception is disabled, the result is tiny, and there is a loss of precision in the result. Bit 5 is the floating point zero divide exception bit (ZX), and is set if a divide-type operation is specified (e.g. divide, reciprocal, etc.), the divisor is zero, and the dividend is finite and non-zero. Bit 6 is the floating point inexact exception bit (XX), and is set if rounded result and the intermediate result differ assuming the precision and exponent range of the intermediate result is unbounded, or if the rounded result overflows and the overflow exception is disabled. Bit 7 is the floating point invalid operation exception for signalling NaN (SNaN) (VXSNAN), and is set if one or more source operands are SNaNs. Bit 8 is the floating point invalid operation exception that is set for add/subtract operations where both operands are infinity (VXISI). Bit 9 is the floating point invalid operation exception that is set for divide operations where both operands are infinity (VXIDI). Bit 10 is the floating point invalid operation exception that is set for divide operations where both operands are zero (VXZDZ). Bit 11 is the floating point invalid operation exception that is set for multiplication operations in which one operand is zero and the other is infinity (VXIMZ). Bit 12 is the floating point invalid operation exception that is set for comparison operations where at least one operand is a NaN (VXVC). Bit 21 is the floating point invalid operation exception for permitting software to force an invalid operation exception by setting bit 21 explicitly (VXSOFT). Bit 22 is the floating point invalid operation exception that is set for a square root operation performed on a negative, non-zero number (VXSQRT). Bit 23 is the floating point invalid operation exception that is set for an integer convert operation involving a number too large to be represented in the target format or a number involving infinity or a NaN (VXCVI).

Bits 13:19 are status and condition code bits, and are not sticky. Bit 13 is the fraction rounded bit (FR), and is set to indicate that the last arithmetic, rounding, or conversion floating point instruction incremented the fraction during rounding. Bit 14 is the fraction inexact (FI) bit, and is set for the last arithmetic, rounding, or conversion floating point instruction in the same fashion as bit 6 but is not sticky. Bit 15 is the class descriptor (C) bit, which is used with the FPCC field bits to describe the result of an arithmetic, rounding, or conversion instruction. The floating point condition code (FPCC) field (bits 15:19) may be used with the class descriptor bit, or may be used with a floating point compare instruction to indicate the result. The floating point compare instruction may set one of the FPCC bits and clear the other bits. The FL bit is set to indicate less than; the FG bit is set to indicate greater than; the FE bit is set to indicate equal; and the FU bit is set if the result is unordered (e.g. a NaN is included in the comparison). Floating point computational instructions may set the class bit and the FPCC bits, as a unit, to one of 9 possible values as defined in the PowerPC instruction set architecture.

Turning now to FIG. 4, a block diagram of one embodiment of the FPSCR field 50 that may be stored in the speculative register storage locations 42 is shown. That is, the FPSCR field 50 may define the format of the FPSCR info encoded by the FPSCR encode circuit 26 and decoded by the FPSCR decode circuit 46 In the illustrated embodiment, the FPSCR field 50 includes an exception encoding field (bits 0:4) that encodes the exceptions detected for the microop; the FR and FI bits (bits 5 and 6 in FIG. 4) which are directly copied to the corresponding FPSCR bits 13 and 14; and the C/FPCC encoding field (bits 7:10 in FIG. 4) that encodes the setting of the class (C) bit and the FPCC field of the FPSCR (bits 15:19 of the FPSCR).

The exception encoding encodes the possible combinations of the exception bits (FPSCR bits 3:12 and 22:23). FIG. 5 is a table illustrating one embodiment of the encodings. Each possible combination of the exception bits being set for a given floating point microop execution (including no exception bits being set) is represented in FIG. 5 with a different encoding value. More generally, the exception encoding may identify which exception bits are placed in the sticky state, and other exception bits are not modified (e.g. they remain in the sticky state or the non-sticky state). FIG. 5 is merely one possibility of assigning encoding values to exception bit combinations. Any set of encoding values may be used in various embodiments.

The FPSCR decode circuit 46 may decode the exception encoding into a series of set bits and clear bits, as indicated in the table of FIG. 5, for bits 3:12 and 22:23 of the architected FPSCR state. The FPSCR decode circuit 46 may logically OR the bits with the current state of the architected FPSCR exception bits 3:12 and 22:23, and with other combinations of bits corresponding to other concurrently retired microops, if any. Thus, sticky states (set, in this embodiment) in the current architected state are maintained and non-sticky states which are being changed to sticky are changed. The result may be stored in the architected FPSCR state, bits 3:12 and 22:23. Additionally, the FPSCR decode circuit 46 may generate bits 0:2 of the architected FPSCR state, as mentioned previously.

The FPSCR decode circuit 46 may also decode the C/FPCC field of the FPSCR field 50 to generate the update of the C and FPCC bits, and may write the result to the C and FPCC fields of the architected FPSCR state (bits 15:19). FIG. 6 is a table illustrating one embodiment of the encodings. FIG. 6 is merely one possibility of assigning encoding values to C/FPCC bit combinations. Any set of encoding values may be used in various embodiments.

As mentioned above, the FPSCR decode circuit 46 may write bits 5 and 6 of the FPSCR field 50 to FPSCR architected state bits 13 and 14 directly (without decoding). If more than one microop is concurrently retired, the FPSCR decode circuit 46 may write the decoded FPCC field and bits 5 and 6 from the FPSCR field 50 of the youngest of the concurrently retiring microops.

Figure 7:
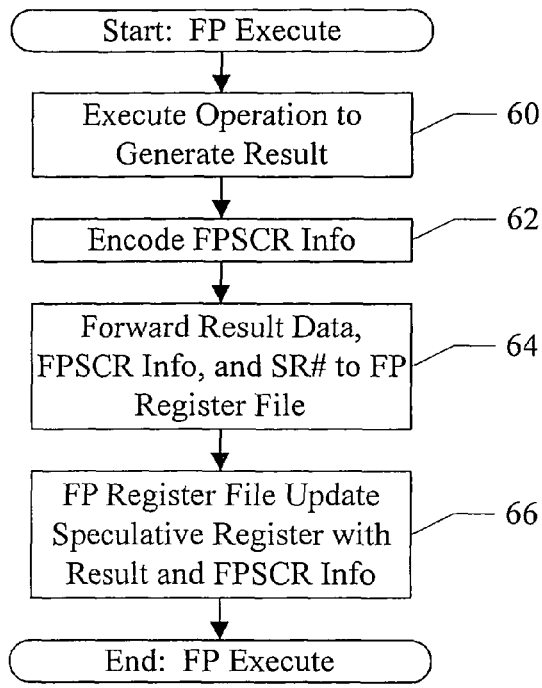
FIG. 7 is a flowchart illustrating operation of one embodiment of a processor shown in FIG. 1 to execute a floating point operation.

Turning now to FIG. 7, a flowchart is shown illustrating operation of one embodiment of the processor 10 during execution of a floating point microop. While the blocks in FIG. 7 are shown in a particular order for ease of understanding, any order may be used. Blocks may be performed in parallel in combinatorial logic within the processor 10. Blocks, combinations of blocks, and/or the flowchart as a whole may be pipelined over multiple clock cycles in various embodiments.

The floating point unit 24 may execute the floating point microop to generate a result (block 60). In one embodiment, the FPU 24 may comprise an 8 stage pipeline for executing floating point microops, although any number of stages may be used. Based on the result and any exceptions that may have been detected during the execution, the FPSCR encode circuit 26 may encode the FPSCR info (e.g. as shown in FIG. 4) (block 62). The floating point unit 24 may transmit the result data, the FPSCR info, and the SR# of the destination of the microop to the floating point register file 22 (block 64). The floating point register file 22 may write the speculative register identified by the SR# with the result data and the FPSCR info (block 66).

Figure 8:
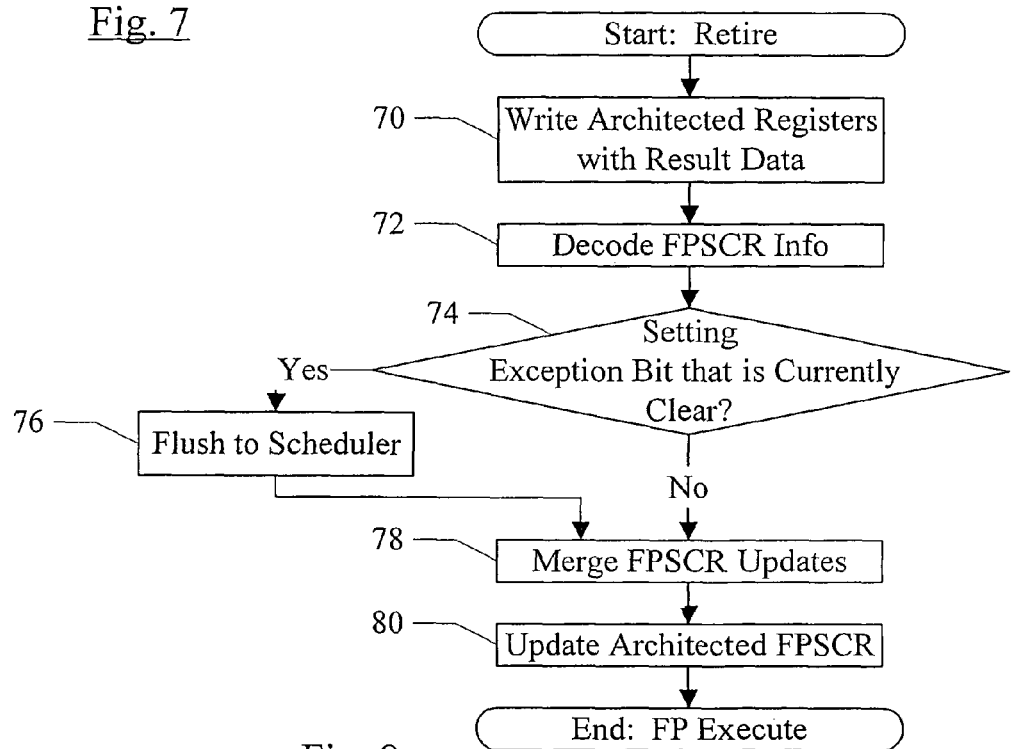
FIG. 8 is a flowchart illustrating operation of one embodiment of a register file shown in FIG. 2 when retiring an instruction operation.

Turning now to FIG. 8, a flowchart is shown illustrating operation of one embodiment of the floating point register file 22 in response to a retire of one or more floating point microops by the scheduler 20. While the blocks in FIG. 8 are shown in a particular order for ease of understanding, any order may be used. Blocks may be performed in parallel in combinatorial logic within the floating point register file 22. Blocks, combinations of blocks, and/or the flowchart as a whole may be pipelined over multiple clock cycles in various embodiments.

The floating point register file 22 may write the architected register for each retired microop with the result data read from the corresponding speculative register (block 70). Additionally, the floating point register file 22 may read the FPSCR info from the FPSCR field of the speculative register(s), and the FPSCR decode circuit 46 may decode the FPSCR info (block 72). The FPSCR decode circuit 46 may compare the exception bits being set according to the decoded FPSCR info to the exception bits currently in the FPSCR architected state. If at least one exception bit is being set that is currently clear in the architected state (decision block 74, "yes" leg), the FPSCR decode circuit 46 may signal a flush to the scheduler 20 (block 76). The FPSCR decode circuit 46 may merge the FPSCR update(s) with the architected FPSCR state, and may update the architected FPSCR state with the merged result (blocks 78 and 80). For the sticky exception bits, merging the updates may include logically ORing the corresponding bits from each microop with the current bits. For the non-sticky bits like the FI, FR, C, and FPCC bits, merging the updates may comprise writing the bits corresponding to the youngest retiring microop. The youngest retiring microop may be the microop that is last, in program order, among the microops being retired.

Numerous variations and modifications will become apparent to those skilled in the art once the above disclosure is fully appreciated. It is intended that the following claims be interpreted to embrace all such variations and modifications.

What is claimed is:

1. A processor comprising:
a plurality of storage locations, wherein each of the plurality of storage locations is addressable as a speculative register and is configured to store result data generated during execution of an instruction operation and a value representing an update for a status/control register (SCR), wherein the value includes at least an exception encoding, and wherein the exception encoding encodes an update to a plurality of exception bits in the SCR, and wherein a first number of bits in the plurality of exception bits is greater than a second number of bits in the exception encoding, and wherein the second number of bits is sufficient to encode each possible combination of one or more exceptions that can occur during execution of an instruction operation, and wherein some combinations of exceptions are not possible, and wherein at least one combination includes at least two exceptions;
a decode circuit coupled to the plurality of storage locations, wherein the decode circuit is coupled to receive the exception encoding from a first storage location of the plurality of storage locations responsive to retirement of a first instruction operation assigned to use the first storage location as a destination, and wherein the decode circuit is configured to decode the exception encoding to generate the plurality of exception bits responsive to retirement of the first instruction; and the SCR coupled to the decode circuit, wherein the decode circuit is configured to update the SCR with the plurality of exception bits generated from the exception encoding.

2. The processor as recited in claim 1 wherein the value further comprises a condition code encoding and wherein the SCR is configured to store a plurality of condition code bits.

3. The processor as recited in claim 1 wherein the value further comprises at least one bit that is directly written to a corresponding bit in the SCR.

4. The processor as recited in claim 1 wherein, if a plurality of instruction operations are concurrently retired, the decode unit is configured to merge updates from a plurality of the plurality of storage locations, wherein each of the plurality of the plurality of storage locations is assigned as the destination of a respective one of the plurality of instruction operations.

5. The processor as recited in claim 4 wherein at least some of the plurality of exception bits are sticky, and wherein the exception encoding indicates which of the plurality of exception bits are changed to the sticky state, and wherein the decode circuit is configured to logically combine the merged updates indicated by the exception encodings from the plurality of the plurality of storage locations with a current state of the plurality of exception bits in the SCR.

6. The processor as recited in claim 5 wherein the sticky state is the set state, and wherein the decode circuit is configured to logically OR the updates.

7. The processor as recited in claim 1 further comprising an execution unit configured to execute instruction operations, wherein the execution unit includes an encode circuit configured to encode the exception encoding responsive to execution of an instruction operation, and wherein the execution unit is configured to transmit the exception encoding and result data corresponding to the executed instruction operation for storage in one of the plurality of storage locations.

8. A processor comprising:
a plurality of storage locations, wherein each of the plurality of storage locations is addressable as a speculative register and is configured to store result data generated during execution of an instruction operation and an exception encoding that encodes one or more exceptions detected during execution of the instruction operation, if any;
a register defined to store an architected state that includes a plurality of exception bits, wherein each of the plurality of exception bits corresponds to a different exception that is detectable during execution of a given instruction operation, wherein a first number of the plurality of exception bits is greater than a second number of bits in the exception encoding, and wherein the second number of bits is sufficient to encode each possible combination of one or more exceptions that can occur during execution of a given instruction operation, wherein some combinations of exceptions are not possible, and wherein at least one combination includes at least two exceptions; and
a decode circuit coupled to the plurality of storage locations and the register, wherein the decode circuit is coupled to receive a first exception encoding from a first storage location of the plurality of storage locations responsive to retirement of a first instruction operation assigned to use the first storage location as a destination, and wherein the decode circuit is configured to decode the first exception encoding to generate the plurality of exception bits responsive to retirement of the first instruction and to update the register with the plurality of exception bits.

9. The processor as recited in claim 8 wherein the architected state further includes a plurality of condition code bits, and wherein each of the plurality of storage locations is further configured to store a condition code encoding, wherein a third number of the plurality of condition code bits is greater than a fourth number of bits in the condition code encoding.

10. The processor as recited in claim 8 wherein each of the plurality of storage locations is further configured to store at least one bit that is directly written to a corresponding bit in the register.

11. The processor as recited in claim 8 wherein the decode circuit is coupled to receive a plurality of exception encodings including the first exception encoding responsive to concurrent retirement of a plurality of instruction operations, and wherein the decode circuit is configured to merge updates indicated by the plurality of exception encodings to update the architected state.

12. The processor as recited in claim 11 wherein the plurality of exception bits are sticky, and wherein the merge includes logically combining a current architected state of the plurality of exception bits and the updates to sticky state indicated by the plurality of exception encodings.

13. The processor as recited in claim 8 further comprising an execution unit configured to execute instruction operations, and wherein the execution unit comprises an encode circuit configured to encode the exception encoding corresponding to an executed instruction operation, and wherein the execution unit is configured to transmit the exception encoding and result data to the plurality of storage locations for storage.

14. The processor as recited in claim 13 wherein the execution unit is a floating point unit configured to execute floating point instruction operations.

15. The processor as recited in claim 8 further comprising a second plurality of storage locations, wherein each of the second plurality of storage locations corresponds to an architected register, and wherein, responsive to retirement of the first instruction operation, the result data from the first storage location is stored in one of the second plurality of storage locations corresponding to the architected register specified by the first instruction operation as a destination.

16. A method comprising:
storing, in a speculative register storage location, both result data generated during execution of an instruction operation and a value representing an update for a status/control register (SCR), wherein the value includes at least an exception encoding, and wherein the exception encoding encodes an update to a plurality of exception bits in the SCR, and wherein a first number of bits in the plurality of exception bits is greater than a second number of bits in the exception encoding, and wherein the second number of bits is sufficient to encode each possible combination of one or more exceptions that can occur during execution of an instruction operation, and wherein some combinations of exceptions are not possible, and wherein at least one combination includes at least two exceptions;
decoding the exception encoding from the speculative register storage location responsive to retirement of a first instruction operation assigned to use the first storage location as a destination, and wherein the decoding comprises generating the plurality of exception bits from the exception encoding; and
storing the plurality of exception bits in the SCR.

17. The method as recited in claim 16 wherein the value comprises a condition code encoding and wherein the plurality of bits comprise condition code bits.

18. The method as recited in claim 16 wherein the value further comprises at least one bit that is directly written to a corresponding bit in the SCR.

19. The method as recited in claim 16 further comprising, if a plurality of instruction operations are concurrently retired, merging updates represented in the exception encoding from a plurality of the plurality of storage locations, wherein each of the plurality of the plurality of storage locations is assigned as the destination of a respective one of the plurality of instruction operations.

20. The method as recited in claim 19 wherein at least some of the plurality of exception bits are sticky, and wherein the first exception encoding indicates which of the plurality of exception bits are changed to the sticky state, and wherein the merging of the updates comprises logically combining the updates indicated by the exception encodings from the plurality of the plurality of storage locations with a current state of the plurality of exception bits in the SCR.

* * * * *